(12) United States Patent
Rouhani et al.

(10) Patent No.: US 11,526,601 B2
(45) Date of Patent: Dec. 13, 2022

(54) DETECTION AND PREVENTION OF ADVERSARIAL DEEP LEARNING

(71) Applicant: The Regents of the University of California, Oakland, CA (US)

(72) Inventors: Bita Darvish Rouhani, San Diego, CA (US); Tara Javidi, San Diego, CA (US); Farinaz Koushanfar, San Diego, CA (US); Mohammad Samragh Razlighi, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 371 days.

(21) Appl. No.: 16/630,326

(22) PCT Filed: Jul. 12, 2018

(86) PCT No.: PCT/US2018/041885
§ 371 (c)(1),
(2) Date: Jan. 10, 2020

(87) PCT Pub. No.: WO2019/014487
PCT Pub. Date: Jan. 17, 2019

(65) Prior Publication Data
US 2020/0167471 A1    May 28, 2020

Related U.S. Application Data

(60) Provisional application No. 62/531,816, filed on Jul. 12, 2017.

(51) Int. Cl.
*G06F 21/55* (2013.01)
*G06N 3/04* (2006.01)
*G06N 3/08* (2006.01)

(52) U.S. Cl.
CPC ......... *G06F 21/554* (2013.01); *G06N 3/0454* (2013.01); *G06N 3/088* (2013.01); *G06F 2221/034* (2013.01)

(58) Field of Classification Search
CPC ............ G06F 21/554; G06F 2221/034; G06N 3/0454; G06N 3/088; G06N 3/0472; G06N 7/005; H04L 63/1425
See application file for complete search history.

(56) References Cited

U.S. PATENT DOCUMENTS 9,288,220 B2 * 3/2016 Raugas ................. H04L 63/145
9,349,103 B2 * 5/2016 Eberhardt, III ........ G06N 20/00
(Continued)

OTHER PUBLICATIONS

Sethi et al, "'Security Theater': On the Vulnerability of Classifiers to Exploratory Attacks", Mar. 24, 2018, p. 1-15.*
(Continued)

*Primary Examiner* — Christopher A Revak
(74) *Attorney, Agent, or Firm* — Mintz Levin Cohn Ferris Glovsky and Popeo, P.C.

(57) ABSTRACT

A method for detecting and/or preventing an adversarial attack against a target machine learning model may be provided. The method may include training, based at least on training data, a defender machine learning model to enable the defender machine learning model to identify malicious input samples. The trained defender machine learning model may be deployed at the target machine learning model. The trained defender machine learning model may be coupled with the target machine learning model to at least determine whether an input sample received at the target machine learning model is a malicious input sample and/or a legitimate input sample. Related systems and articles of manufacture, including computer program products, are also provided.

20 Claims, 8 Drawing Sheets

Legitimate Input
Sample 230

Malicious Input
Sample 240

(56) References Cited

U.S. PATENT DOCUMENTS

| | | | |
|---|---|---|---|
| 10,713,358 B2* | 7/2020 | Sikorski | G06F 21/563 |
| 11,128,664 B1* | 9/2021 | Andersson | H04L 63/1441 |
| 2015/0039543 A1 | 2/2015 | Athmanathan et al. | |
| 2017/0032279 A1* | 2/2017 | Miserendino | G06N 5/04 |
| 2018/0018459 A1* | 1/2018 | Zhang | G06F 21/566 |
| 2020/0076835 A1* | 3/2020 | Ladnai | G06F 21/562 |
| 2020/0159924 A1* | 5/2020 | Tran | G06N 3/0454 |

OTHER PUBLICATIONS

Abadi, M. et al., "Tensorflow: Large-scale machine learning on heterogeneous distributed systems," arXiv preprint arXiv:1603.04467, 2016.

Anjos, A. et al., "Counter-measures to photo attacks in face recognition: a public database and a baseline," IEEE 978:1 pp. 1-7, 2011.

Barreno, M. et al., "Can machine learning be secure?" ACM Symposium ICCS 1-59593-272, pp. 16-25, 2006.

Biggio, B. et al., "Evasion attacks against machine learning at test time," Proceedings of the 2013th European Conference on Machine Learning and Knowledge Discovery in Databases, vol. 3, pp. 387-402, 2013.

Biggio, B. et al., "Pattern recognition systems under attack: Design issues and research challenges," International Journal of Pattern Recognition and Artificial Intelligence, vol. 28, No. 07, p. 1460002, 2014.

Biggio, B. et al., "Support vector machines under adversarial label noise," JMLR: ACML, vol. 20, pp. 97-112, 2011.

Bottou, L., "Large-scale machine learning with stochastic gradient descent," Proceedings of COMPSTAT, pp. 177-186, 2010.

Carlini, N. et al., "Defensive distillation is not robust to adversarial examples," arXiv: 1607.04311v1 arXiv preprint, 2016.

Ciresan, D., et al., "Multi-column deep neural networks for image classification," arXiv preprint arXiv:1202.2745, 2012.

Dahl, G. E. et al., "Context-dependent pre-trained deep neural networks for large-vocabulary speech recognition," IEEE Transactions on Audio, Speech, and Language Processing, vol. 20, No. 1, pp. 30-42, 2012.

Dahl, G. E. et al., "Large-scale malware classification using random projections and neural networks," 2013 IEEE International Conference on Acoustics, Speech and Signal Processing, pp. 3422-3426, 2013.

Deng, J. et al., "ImageNet: A Large-Scale Hierarchical Image Database," 2009 IEEE Conference on Computer Vision and Pattern Recognition, 2009.

Deng, L. et al., "Deep learning: methods and applications," Foundations and Trends® in Signal Processing, vol. 7, No. 3-4, pp. 197-387, 2014.

Fogla, P. et al., "Evading network anomaly detection systems: formal reasoning and practical techniques," CCS '06: Proceedings of the 13th ACM conference on Computerand communications security, pp. 59-68, 2006.

Goodfellow, I. J. et al., "Explaining and harnessing adversarial examples," arXiv preprint arXiv.1412.6572, 2014.

Goodfellow, I. et al., "Generative adversarial nets," arXiv preprint arXiv:1406.2261v1, 2014.

Gu, S. et al., "Towards deep neural network architectures robust to adversarial examples," arXiv preprint arXiv:1412.5068, 2014.

Hinton, G. et al., "Deep neural networks for acoustic modeling in speech recognition: The shared views of four research groups," IEEE Signal Processing Magazine, vol. 29, No. 6, pp. 82-97, 2012.

Huang, L. et al., "Adversarial machine learning," AISec '11: Proceedings of the 4th ACM workshop on Security and artificial intelligence, pp. 43-58, 2011.

Huang, R. et al., "Learning with a strong adversary," arXiv preprint arXiv:1511.03034, 2015.

Jin, J. et al., "Robust convolutional neural networks under adversarial noise," arXiv preprint arXiv:1511.06306, 2015.

Jolliffe, I., "Principal component analysis." Wiley Online Library, 2005.

Knorr, E., "How paypal beats the bad guys with machine learning," inforworld.com/article/2907877/how-paypal-reduces-fraud-with-machine-learning.html, 2015.

Kos, J. et al., "Adversarial examples for generative models," arXiv preprint arXiv:1702.06832, 2017.

Krizhevsky, A. et al., "Imagenet classification with deep convolutional neural networks," pp. 1097-1105, 2012.

Krizhevsky, A. et al., "Learning multiple layers of features from tiny images," 2009.

Lecun, Y. et al., "Deep learning," Nature, vol. 521, No. 7553, pp. 436-444, 2015.

Lecun, Y. et al., "Gradient-based learning applied to document recognition," Proceedings of the IEEE, vol. 86, No. 11, pp. 2278-2324, 1998.

Lecun, Y. et al., "The MNIST database of handwritten digits," 1998.

Mairal, J. et al., "Supervised dictionary learning," arXiv preprint arXiv:0809.3083, 2008.

McDaniel, P. et al., "Machine learning in adversarial settings," IEEE Security & Privacy, vol. 14, No. 3, pp. 68-72, 2016.

Mirhoseini, A. et al., "Rankmap: A platform-aware framework for distributed learning from dense datasets," arXiv preprint arXiv:1503.08169, 2015.

Papenot, N. et al., "The limitations of deep learning in adversarial settings," arXiv preprint arXiv:1511.07528, 2016.

Papernot, N. et al., "Practical black-box attacks against deep learning systems using adversarial examples," arXiv preprint arXiv.1602.02697, 2016.

Radford, A. et al., "Unsupervised representation learning with deep convolutional generative adversarial networks," arXiv preprint arXiv:1511.06434, 2016.

Rouhani, B. D. et al., "Delight: Adding energy dimension to deep neural networks," ISLPED '16: Proceedings of the 2016 International Symposium on Low Power Electronics and Design, pp. 112-117, 2016.

Salimans, T et al., "Improved techniques fortraining gans," NIPS'16: Proceedings of the 30th International Conference on Neural Information Processing Systems, pp. 2226-2234, 2016.

Shaham, U. et al., "Understanding adversarial training: Increasing local stability of neural nets through robust optimization," arXiv preprint arXiv:1511.05432, 2016.

Srivastava, N. et al., "Dropout: a simple way to prevent neural networks from overfitting," Journal of Machine Learning Research (JMLR), vol. 15, No. 1, pp. 1929-1958, 2014.

Szegedy, C. et al., "Intriguing properties of neural networks," arXiv preprint arXiv:1312.6199, 2013.

Taigman, Y. et al., "Deepface: Closing the gap to human-level performance in face verification," In CVPR, 2014.

Tropp, J. et al., "Signal recovery from random measurements via orthogonal matching pursuit," IEEE Transactions on Information Theory, vol. 53, No. 12, pp. 4655-4666, 2007.

Wang, B. et al., "A theoretical framework for robustness of (deep) classifiers under adversarial noise," arXiv preprint arXiv:1612.00334, 2017.

Wen, Y. et al., "A discriminative feature learning approach for deep face recognition," pp. 499-515, 2016.

Yuan, Z. et al., "Droid-sec: deep learning in android malware detection," ACM SIGCOMM Computer Communication Review, vol. 44, No. 4, pp. 371-372, 2014.

Zheng, S. et al., "Improving the robustness of deep neural networks via stability training," Proceedings of the IEEE Conference on Computer Vision and Pattern Recognition (CVPR), pp. 4480-4488, 2016.

Li et al. "Adversarial Examples Detection in Deep Networks with Convolutional Filter Statistics." In: Cornell University Library, Computer Science, Computer Vision and Pattern Recognition., Dec. 22, 2016 [online] [retrieved on Sep. 11, 2018 (Sep. 11, 2018)] Retrieved from the Internet <URL: https://arxiv.org/abs/1612.07767>, entire document, especially Abstract; p. 2-7.

Huang et al. "Safety Verification of Deep Neural Networks." In: Cornell University Library, Computer Science, Artificial Intelligence., Oct. 21, 2016 [online] [retrieved on Sep. 11, 2018 (Sep. 11, 2018)] Retrieved from the Internet <URL: https://arxiv.org/abs/1610.06940>, entire document.

(56) References Cited

OTHER PUBLICATIONS

Papernot et al. "Distillation as a Defense to Adversarial Perturbations against Deep Neural Networks." In: 37th IEEE Symposium on Security & Privacy, IEEE 2016., Mar. 14, 2016 [online] [retrieved on Sep. 11, 2018 (Sep. 11, 2018)] Retrieved from the Internet <URL:https://ieeexplore.ieee.org/document/7546524/>, entire document.

* cited by examiner

DETECTION AND PREVENTION OF ADVERSARIAL DEEP LEARNING

RELATED APPLICATION

This application claims priority to U.S. Provisional Application No. 62/531,816 entitled "CHARACTERIZING AND THWARTING ADVERSARIAL DEEP LEARNING" and filed on Jul. 12, 2017, the disclosure of which is incorporated herein by reference in its entirety.

TECHNICAL FIELD

The subject matter described herein relates generally to machine learning and more specifically to the detection and prevention of adversarial deep learning.

BACKGROUND

Machine learning models may be trained to perform a variety of cognitive tasks including, for example, object identification, natural language processing, information retrieval, and speech recognition. A deep learning model such as, for example, a neural network, a belief network, a restricted Boltzmann machine, and/or the like, may be trained to perform a regression task. The regression task may require the deep learning model to predict, based at least on variations in one or more independent variables, corresponding changes in one or more dependent variables. Alternatively and/or additionally, a deep learning model may be trained to perform a classification task by at least assigning input samples to one or more categories. The deep learning model may be trained to perform the classification task based on training data that has been labeled in accordance with the known category membership of each sample included in the training data.

SUMMARY

Systems, methods, and articles of manufacture, including computer program products, are provided for detecting and preventing adversarial deep learning. In some example embodiments, there is provided a system that includes at least one processor and at least one memory. The at least one memory may include program code that provides operations when executed by the at least one processor. The operations may include: training, based at least on training data, a first defender machine learning model to enable the first defender machine learning model to identify malicious input samples; and deploying, at a target machine learning model, the trained first defender machine learning model, the trained first defender machine learning model being coupled with the target machine learning model to at least determine whether an input sample received at the target machine learning model is a malicious input sample and/or a legitimate input sample.

In some variations, one or more features disclosed herein including the following features can optionally be included in any feasible combination. The trained first defender machine learning model may respond to the input sample received at the target machine learning model by at least generating a first output indicative of whether the input sample is a malicious input sample and/or a legitimate input sample. The first output may be aggregated with a second output from a trained second defender machine learning model deployed at the target machine learning model. The second output may indicate whether the input sample is determined to be a malicious input sample and/or a legitimate input sample by the trained second defender machine learning. The first output and the second output may be aggregated to generate a metric indicative of a legitimacy of an output inference generated by the target machine learning model processing the input sample.

In some variations, a layer of the target machine learning model may be identified based at least on an instability and/or a sensitivity exhibited by the layer of the target machine learning model to perturbations in one or more input samples processed by the target machine learning model. The trained first defender machine learning model may be deployed at the layer of the target machine learning model. The trained first defender machine learning model may be deployed at the layer of the target machine learning model and a second defender machine learning model may be deployed at a subsequent layer of the target machine learning model. The first defender machine learning model and the second defender machine learning model may be configured to be negatively correlated by at least training the second defender machine learning model based on training data that includes perturbations not present in the training data used to train the first defender machine learning model. The trained second defender machine learning model may identify at least some malicious input samples that are able to bypass the trained first defender machine learning model.

In some variations, the layer of the target machine learning model may be an input layer of the target machine learning model. The trained first defender machine learning model may be deployed at the input layer of the target machine learning model to at least identify malicious input samples prior to any processing by the target machine learning model.

In some variations, the layer of the target machine learning model may be an intermediate layer of the target machine learning model. The trained first defender machine learning model may be deployed at the intermediate layer of the target machine learning model to at least identify malicious input samples based on a latent response triggered, by the malicious input samples, at the intermediate layer of the target machine learning model. The intermediate layer of the target machine learning model may be a core computation layer, a normalization layer, and/or a non-linearity layer.

In some variations, the training data may include a plurality of legitimate input samples. The first defender machine learning model may be trained to learn a probability density function of plurality of legitimate input samples. The training data may further exclude malicious input samples. The first defender machine learning model may be subject to unsupervised training based on the training data that excludes malicious input samples.

In some variations, the trained first defender machine learning model may determine whether the input sample is a malicious input sample and/or a legitimate input sample by at least determining, based on the probability density function, a probability of the input sample originating from the explored subspace of the target machine learning model. The input sample may be determined to be a malicious input sample based at least on the probability of the input sample originating from the explored subspace of the target machine learning model not exceeding a threshold value.

In some variations, the first defender machine learning model may be trained to learn a dictionary of features associated with legitimate input samples. The trained first defender machine learning model may determine whether the input sample is a malicious input sample and/or a legitimate input sample by at least reconstructing, based on the dictionary, the input sample. The trained first defender machine learning model may determine, based at least on a peak signal to noise ratio of the reconstructed input sample, whether the input sample is a malicious input sample and/or a legitimate input sample.

In some variations, the first defender machine learning model may be a replica of the target machine learning model by a least having a same topographical structure and/or parameters as the target machine learning model. The target machine learning model and/or the first defender machine learning model may be a deep learning model.

In some variations, a defender machine learning model may be deployed at every layer of the target machine learning model. Each defender machine learning model may be trained to determine whether the input sample received at the target machine learning model is a malicious input sample and/or a legitimate input sample.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
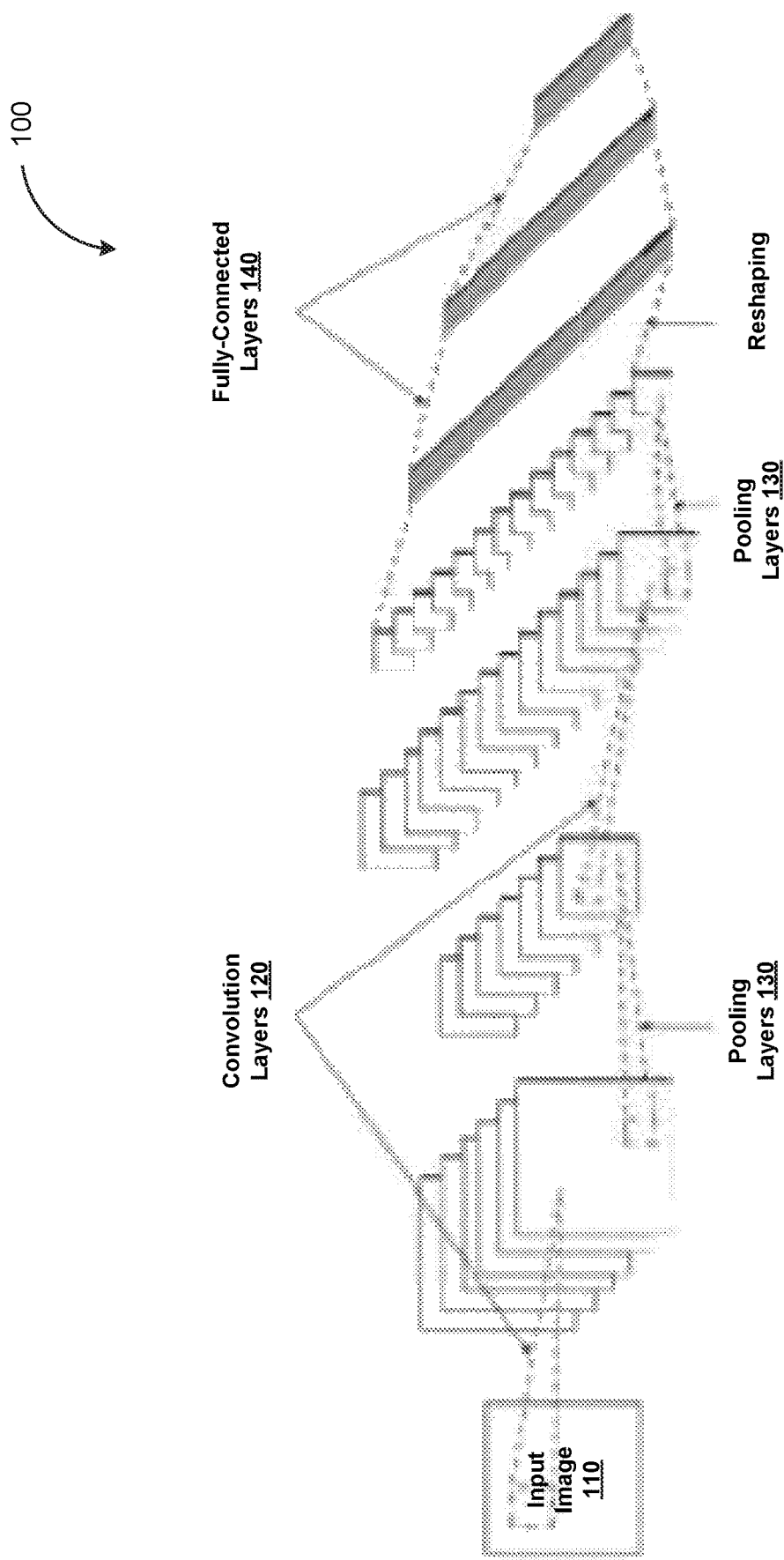
FIG. 1 depicts a schematic diagram illustrating a machine learning model, in accordance with some example embodiments.

Machine learning models may be trained to perform a variety of cognitive tasks including, for example, classification, regression, feature extraction, pattern recognition, and/or the like. However, a conventional machine learning model may be susceptible to adversarial attacks in which the machine learning model is given malicious input samples that have been engineered to mislead the machine learning model. For example, in a discriminatory attack, a target machine learning model may be given a malicious input sample that includes one or more perturbations. These perturbations, although often imperceptible, may be sufficient to cause the target machine learning model to generate an erroneous output inference. Alternatively and/or additionally, in a generative attack, a malicious machine learning model (e.g., a generative machine learning model) may interact with a target machine learning model (e.g., a discriminative machine learning model) to identify key features in legitimate input samples that cause the target machine learning model to generate certain output inferences. In doing so, the malicious machine learning model may learn how to forge malicious input samples that mimic legitimate input samples. As such, in some example embodiments, a target machine learning model may be coupled with one or more defender machine learning models configured to prevent adversarial deep learning by at least detecting the presence of malicious input samples.

In some example embodiments, a target machine learning model may be a deep learning network having a plurality of layers including, for example, core computation layers, normalization layers, pooling layers, non-linearity layers, and/or the like. The target machine learning model may be coupled with one or more defender machine learning models, each of which having a same topographical structure and/or parameters (e.g., weights, biases, and/or the like) as the target machine learning model. According to some example embodiments, a defender machine learning model may be deployed at each layer of the target machine learning model. Alternatively and/or additionally, a defender machine learning model may be deployed at the layers of the target machine learning model that are most susceptible to malicious input samples, for example, by exhibiting the most instability and/or sensitivity to perturbations in the input samples processed by the target machine learning model.

In some example embodiments, a defender machine learning model may be deployed at an input layer of a target machine learning model. A defender machine learning model deployed at the input layer of a target machine learning model may be configured to determine, prior to any processing by the target machine learning model, whether an input sample is a malicious input sample or a legitimate input sample. Alternatively and/or additionally, a defender machine learning model may be deployed at one or more intermediate layers of the target machine learning model. A defender machine learning model deployed at an intermediate layer of the target machine learning model may be configured to determine, based at least on a latent response observed at the intermediate layer, whether an input sample triggering the latent response is a malicious input sample or a legitimate input sample.

In some example embodiments, a plurality of defender machine learning models deployed at a target machine learning model may be negatively correlated, for example, by being trained to form a sequence (e.g., Markov chain) of defender machine learning models. For example, additional perturbations may be added to the training data used to train the defender machine learning model deployed at each successive layer of the target machine learning model. Accordingly, the training data used to train a defender machine learning model deployed at one layer of the target machine learning model may include perturbations that are not included in the training data used to train a defender machine learning model deployed at a preceding layer of the target machine learning model. In doing so, each of the defender machine learning models may be trained to detect different malicious input samples. Moreover, a malicious input sample that is able to bypass one defender machine learning model may be captured by a subsequent defender machine learning model.

In some example embodiments, a defender machine learning model may be trained to learn a probability density function (PDF) associated with the legitimate input samples of a target machine learning model. For example, a defender machine learning model deployed at an input layer of the target machine learning model may be trained to learn a probability density function of legitimate input samples whereas a defender machine learning model deployed at an intermediate layer of the target machine learning model may be trained to learn a probability density function of a latent response triggered by the legitimate input samples. The probability density function associated with legitimate input samples may correspond to an explored subspace of the target machine learning model, which may be occupied by subsets of data frequently encountered by the target machine learning model, for example, during a training of the target machine learning model. By contrast, malicious input samples may typically originate from the unexplored subspace of the target machine learning model, which may be occupied by subsets of data infrequently encountered by the target machine learning model. For instance, a malicious input sample may be generated by manipulating the non-critical (e.g., nuisance) features of input samples occupying the unexplored subspace of the target machine learning model. Accordingly, the defender machine learning model may be configured to determine, based at least on the probability density function, a probability of an input sample and/or a latent response to the input sample. The defender machine learning model may be further configured to identify the input sample as a malicious input sample if the probability of the input sample and/or the corresponding latent response fails to exceed a threshold value.

FIG. 1 depicts a schematic diagram illustrating a machine learning model 100, in accordance with some example embodiments. Referring to FIG. 1, the machine learning model 100 may be a deep learning model such as, for example, a neural network and/or the like. Furthermore, as shown in FIG. 1, the machine learning model 100 may be trained to perform a classification task, for example, by assigning an input image 110 to one or more categories.

As noted, a machine learning model may include a plurality of layers including, for example, core computation layers, normalization layers, pooling layers, non-linear layers, and/or the like. To further illustrate, FIG. 1 shows the machine learning model 100 as having, for example, one or more convolution layers 120, pooling layers 130, and fully-connected layers 140. Meanwhile, Table 1 below depicts examples of layers that may be present in a machine learning model such as, for example, a deep learning neural network.

TABLE 1

| DL Layers | | Description |
|---|---|---|
| Core Computations | Fully-Connected | $x_i^{(l)} = \sum_{j=1}^{N_{l-1}} \theta_{ij}^{(l-1)} \times z_j^{(l-1)}$ |
| | 2D Convolution | $x_{ij}^{(l)} = \sum_{s_1=1}^{k} \sum_{s_2=2}^{k} \theta_{s_1 s_2}^{(l-1)} \times z_{(i+s_1)(j+s_2)}^{l-1}$ |
| Normalization | $L_2$ Normalization | $x_i^{(l)} = \dfrac{x_i^{(l)}}{\sqrt{\sum_{j=1}^{N_l} |x_j^{(l)}|^2}}$ |
| | Batch Normalization | $x_i^{(l)} = \dfrac{x_i^{(l)} - \mu_B^{(l)}}{\sqrt{\dfrac{1}{b_s} \sum_{j=1}^{b_s} (x_j^{(l)} - \mu_B^{(l)})^2}}$ |
| Pooling | 2D Max Pooling | $x_{ij}^{(l)} = \text{Max}(y_{(i+s_1)(j+s_2)}^{l-1})_{s_1 \in \{1,2,\ldots,k\},\, s_2 \in \{1,2,\ldots,k\}}$ |
| | 2D Mean Pooling | $x_{ij}^{(l)} = \text{Mean}(z_{(i+s_1)(j+s_2)}^{l-1})_{s_1 \in \{1,2,\ldots,k\},\, s_2 \in \{1,2,\ldots,k\}}$ |
| Non-linearities | Softmax | $z_i^{(l)} = \dfrac{e^{x_i^{(l)}}}{\sum_{j=1}^{N_l} e^{x_j^{(l)}}}$ |
| | Sigmoid | $z_i^{(l)} = \dfrac{1}{1 + e^{-x_i^{(l)}}}$ |
| | Tangent Hyperbolic | $z_i^{(l)} = \dfrac{\text{Sinh}(x_i^{(l)})}{\text{Cosh}(x_i^{(l)})}$ |
| | Rectified Linear unit | $z_i^{(l)} = \text{Max}(0, x_i^{(l)})$ |

A target machine learning model such as, for example, the machine learning model 100 shown in FIG. 1, may be susceptible to adversarial attacks in which the target machine learning model is given malicious input samples engineered to mislead the target machine learning model. For example, in a discriminatory attack, the target machine learning model may be given malicious input samples having perturbations that may cause the target machine learning model to generate erroneous output inferences. Alternatively and/or additionally, in a generative attack, the target machine learning model may be given malicious input samples that have been forged to mimic legitimate input samples.

Figure 2A:
FIG. 2A depicts an example of a legitimate input sample and a corresponding malicious input sample, in accordance with some example embodiments.
Figure 2A:

To further illustrate, FIG. 2A depicts an example of a legitimate input sample 210 and a corresponding malicious input sample 220, in accordance with some example embodiments. The malicious input sample 220 may be generated by adding, to the legitimate input sample 210, perturbations including, for example, noise and/or the like. These perturbations, although imperceptible, may cause a target machine learning model (e.g., the machine learning model 100 and/or the like) to generate an erroneous output inference. For instance, in the example shown in FIG. 2A, the target machine learning model may correctly classify the legitimate input sample 210 as an image of a dog. By contrast, the target machine learning model may misclassify the malicious input sample 220 as an image of a swan.

Figure 2B:
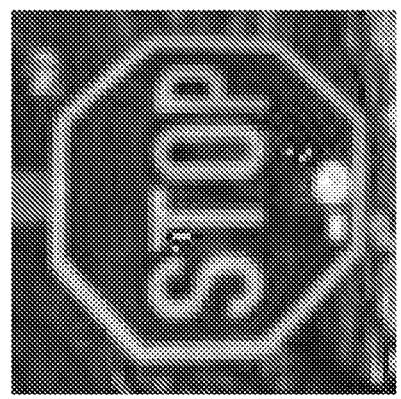
FIG. 2B depicts another example of a legitimate input sample and a corresponding malicious input sample, in accordance with some example embodiments.
Figure 2B:
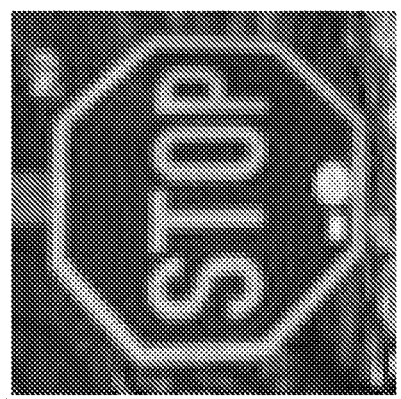

FIG. 2B depicts another example of a legitimate input sample 230 and a corresponding malicious input sample 240. The malicious input sample 240 may also be generated by adding perturbations (e.g., noise and/or the like) to the legitimate input sample 230. In the example shown in FIG. 2B, the target machine learning model may correctly classify the legitimate input sample 230 as an image of a stop sign. However, the perturbations that are present in the malicious input sample 240 may cause the target machine learning model to misclassify the malicious input sample 240 as an image of a yield sign.

In some example embodiments, one or more defender machine learning models may be deployed at a target machine learning model such as, for example, the machine learning model 100 shown in FIG. 1, in order to prevent adversarial attacks against the target machine learning model. For example, a defender machine learning model may be deployed at each layer of the target machine learning model. Alternatively and/or additionally, a defender machine learning model may be deployed at the layers of the target machine learning model that are most susceptible to malicious input samples, for example, by exhibiting the most instability and/or sensitivity to perturbations in the input samples processed by the target machine learning model. Equation (1) below define the instability associated with an individual layer of a target machine learning model:

$$\underset{r \ne 0}{\text{Sup}} \frac{\|f_l(x_l + r_l) - f_l(x_l)\|}{\|r_l\|} \quad (1)$$

wherein Sup may denote a supremum value, $x_l$ may correspond to an input to an $l^{th}$ layer of the target machine learning model, and $r_l$ may correspond to an additive perturbation that is propagated to the input of the $l^{th}$ layer of the target machine learning model. To further illustrate, Equation (2) below define the instability associated with a core computation layer of the machine learning model (e.g., one of the convolution layers 120 and/or the fully-connected layers 140) having the parameter set $\theta_l$.

$$\underset{r \ne 0}{\text{Sup}} \frac{\|f_l(x_l + r_l) - f_l(x_l)\|}{\|r_l\|} = \frac{\|\theta_l \times r_l\|}{\|r_l\|} \quad (2)$$

The instability of a core computation layer may be bound by a spectrum of the underlying parameters of the core computation layer. For instance, given the principal spectrum of the parameter set $\theta_l$, the upper bound of Equation (2) may be achieved when the perturbation vector r is aligned with a main Eigenvector of the underlying parameter set $\theta_l$. Accordingly, the instability associated with the individual layers of a machine learning model may be quantified and/or compared based on a spectral energy factor (SEF) computed using Equation (3) below.

$$SEF(\theta_l) = \frac{|e_1|}{\min(N_{l-1}, N_l) \sum_{i=1} |e_1|} \quad (3)$$

wherein $|e_1|$ may denote an absolute value of the $i^{th}$ Eigenvalue and $N_l$ may denote a quantity of neurons in the $l^{th}$ layer of the target machine learning model.

The layers of the target machine learning model that exhibit the most instability and/or sensitivity to perturbations in the input samples processed by the target machine learning model may be identified based on the spectral energy factor of each of the layers of the target machine learning model. As noted, according to some example embodiments, defender machine learning models may be deployed at the layers of the target machine learning model that are determined to exhibit the most instability and/or sensitivity.

In some example embodiments, a defender machine learning model may be deployed at an input layer of a target machine learning model such as, for example, the machine learning model 100 shown in FIG. 1. A defender machine learning model deployed the input layer of a target machine learning model may be configured to determine, prior determine, prior to any processing by the target machine learning model, whether an input sample is a malicious input sample or a legitimate input sample. Alternatively and/or additionally, a defender machine learning model may be deployed at one or more intermediate layers of the target machine learning model. A defender machine learning model deployed at an intermediate layer of the target machine learning model may be configured to determine, based at least on a latent response observed at the intermediate layer to an input sample, whether the input sample is a malicious input sample or a legitimate input sample.

Figure 3:
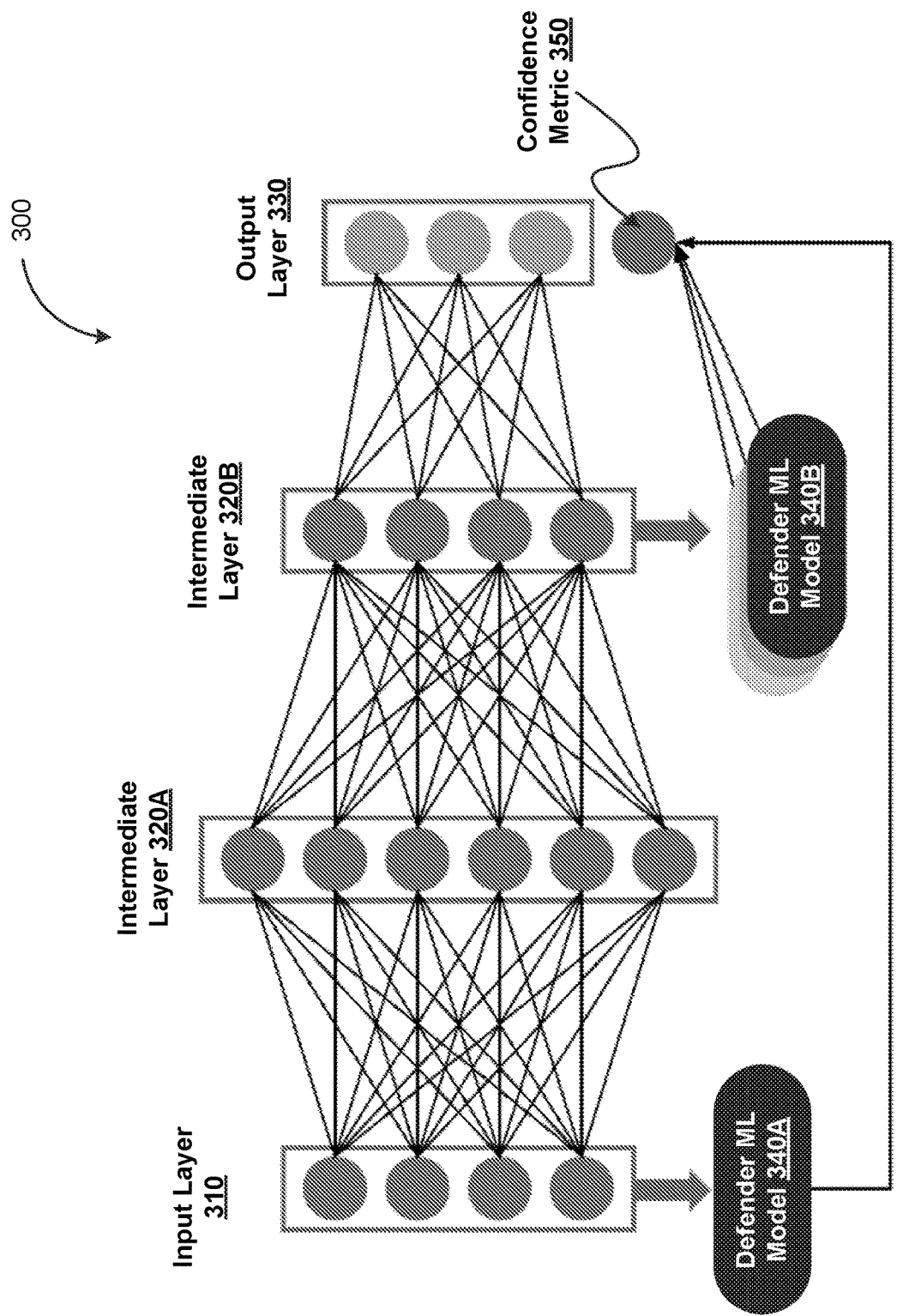
FIG. 3 depicts an example deployment of one or more defender machine learning models, in accordance with some example embodiments.

To further illustrate, FIG. 3 depicts an example deployment of one or more defender machine learning models, in accordance with some example embodiments. Referring to FIG. 3, a N quantity of defender machine learning models may be deployed at a target machine learning model 300 having an input layer 310, a first intermediate layer 320A, a second intermediate layer 320B, and an output layer 330. For instance, as shown in FIG. 3, a first defender machine learning model 340A may be deployed at the input layer 310. The first defender machine learning model 340A may be configured to determine, prior to any processing by the target machine learning model 300, whether an input sample is a malicious input sample or a legitimate input sample.

Alternatively and/or additionally, one or more defender machine learning models may be deployed at the intermediate layers of the target machine learning model 300. For instance, as shown in FIG. 3, a second defender machine learning model 340B may be deployed at the second intermediate layer 320B of the target machine learning model 300. The second defender machine learning model 340B may be configured to determine, based at least on a latent response observed at the second intermediate layer 320B, whether an input sample triggering the latent response is a malicious input sample or a legitimate input sample. It should be appreciated that a defender machine learning model may be deployed at the second intermediate layer 320B but not at the first intermediate layer 320A based at least on the second intermediate layer 320B exhibiting more instability and/or sensitivity to perturbations in the input samples processed by the target machine learning model 300 than the first intermediate layer 320A. For example, the second intermediate layer 320B may be associated with a higher spectral energy factor (SEF) than the first intermediate layer 320A.

In some example embodiments, each of the N quantity of defender machine learning models deployed at the target machine learning model 300 may be a replica of the target machine learning model 300. For instance, the first defender machine learning model 340A and/or the second defender machine learning model 340B may have a same topographical structure and/or parameters (e.g., weights, biases, and/or the like) as the target machine learning model 300. Furthermore, the first defender machine learning model 340A and/or the second defender machine learning model 340B may be trained using a same training data as the target machine learning model 300. Accordingly, the first defender machine learning model 340A and/or the second defender machine learning model 340B may exhibit a same latent response to an input sample as the target machine learning model 300.

In some example embodiments, each of the N quantity of defender machine learning models deployed at the target machine learning model 300 may be trained to learn a probability density function (PDF) associated with the legitimate input samples of the target machine learning model 300. For instance, the first defender machine learning model 340A may be trained to learn a probability density function of the legitimate input samples received at the input layer 310 whereas the second defender machine learning model 340B may be trained to learn a probability density function of the latent responses triggered by the legitimate input samples at the second intermediate layer 320B. As noted, the probability density functions associated with legitimate input samples may correspond to an explored subspace of the target machine learning model 300, which may be occupied by subsets of data frequently encountered by the target machine learning model 300. Meanwhile, malicious input samples may often originate from the unexplored space of the target machine learning model 300, which may be occupied by subsets of data infrequently encountered by the target machine learning model 300. Accordingly, each of the N quantity of defender machine learning models may use a corresponding probability density function to differentiate between legitimate input samples from the explored subspace of the target machine learning model 300 and malicious input samples from the unexplored subspace of the target machine learning model 300.

Referring again to FIG. 3, each of the N quantity of defender machine learning models deployed at the target machine learning model 300 may be configured to generate an output indicative of whether an input sample is a malicious input sample or a legitimate input sample. For instance, the first defender machine learning model 340A and/or the second defender machine learning model 340B may determine, based on a corresponding probability density function, a probability associated with an input sample. The first defender machine learning model 340A and/or the second defender machine learning model 340B may further determine, based at least on the probability of the input sample, whether the input sample is a legitimate input sample or a malicious input sample.

In some example embodiments, each of the N quantity of defender machine learning models may be associated with a security parameter $P_n$ corresponding to a threshold probability for an input sample to be recognized as a legitimate input sample. For example, the first defender machine learning model 340A may identify an input sample as a malicious input sample if the probability associated with the input sample does not exceed a corresponding security parameter. Alternatively and/or additionally, the second defender machine learning model 340B may identify an input sample as a malicious input sample if the probability of the latent response triggered by the input sample does not exceed a corresponding security parameter.

Each of N quantity of defender machine learning models may generate an output indicative of whether an input sample is a malicious input sample or a legitimate input sample. For instance, each of the N quantity of defender machine learning models may generate a binary output $d_k \in \{0,1\}$ in which the value 1 may denote a malicious input sample and the value 0 may denote a legitimate input sample. According to some example embodiments, the outputs $\{d_1, d_2, \ldots, d_N\}$ from the N quantity of defender machine learning models may be aggregated to form a confidence metric 350, which may indicate a legitimacy of an output inference observed at the output layer 330 of the target machine learning model 300. For example, the outputs $\{d_1, d_2, \ldots, d_N\}$ from the N quantity of defender machine learning models may be aggregated by at least computing, in accordance with Equation (4) below, an aggregate probability $P(a=1|\{d_1, d_2, \ldots, d_N\})$ of the input sample being a malicious input sample.

$$P(a=1|\{d_1,d_2,\ldots,d_N\})=1-\Pi_{n=1}^{N}(1-P_n)^{d_n} \quad (4)$$

It should be appreciated that a malicious input sample may be associated with a relatively low confidence metric 350 due to at least some of the N quantity of defender machine learning models generating an output identifying the malicious input sample as such. For instance, in some example embodiments, an input sample may be identified as a malicious input sample when the confidence metric 350, which may correspond to an aggregate probability of the input sample being a malicious input sample, exceeds a threshold value (e.g., $P(a=1|\{d_1, d_2, \ldots, d_N\}) \geq 0.5$ or a different threshold value).

As noted, in some example embodiments, each of the N quantity of defender machine learning models deployed at the target machine learning model 300 may be trained to learn a probability density function associated with legitimate input samples for the target machine learning model 300. For instance, the first defender machine learning model 340A, which may be deployed at the input layer 310 of the target machine learning model 300, may be trained to learn a probability density function for the legitimate input samples that are received at the input layer 310 of the target machine learning model 300. Alternatively and/or additionally, the second defender machine learning model 340B, which may be deployed at the second intermediate layer 320B of the target machine learning model 300, may be trained to learn a probability density function of the latent responses triggered by legitimate input samples at the second intermediate layer 320B of the target machine learning model 300. According to some example embodiments, the first defender machine learning model 340A and/or the second defender machine learning model 340B may be subject to unsupervised training. That is, the first defender machine learning model 340A and/or the second defender machine learning model 340B may be trained using training data that excludes malicious input samples. However, it should be appreciated that the first defender machine learning model 340A and/or the second defender machine learning model 340B may be subject to any type of training technique.

In some example embodiments, a defender machine learning model that is deployed at an intermediate layer of a target machine learning model may be trained to learn a probability density function associated with a latent response triggered at the intermediate layer by legitimate input samples processed by the target machine learning model. For instance, the second defender machine learning model 340B may be trained to learn a probability density function (e.g., a Gaussian Mixture Model and/or the like) of one or more feature maps output by the second intermediate layer 320B in response to one or more legitimate input samples processed by the target machine learning model 300. According to some example embodiments, the probability density function may be generated to disentangle different classes of input samples, for example, by minimizing a distance (e.g., a Euclidean distance and/or the like) between input samples from a same class and/or maximizing a distance (e.g., a Euclidean distance and/or the like) between input samples from different classes. As noted, the second defender machine learning model 340B may use the probability density function associated with legitimate input samples to differentiate between latent responses that are triggered by legitimate input samples and latent responses that are triggered by malicious input samples.

Figure 4:
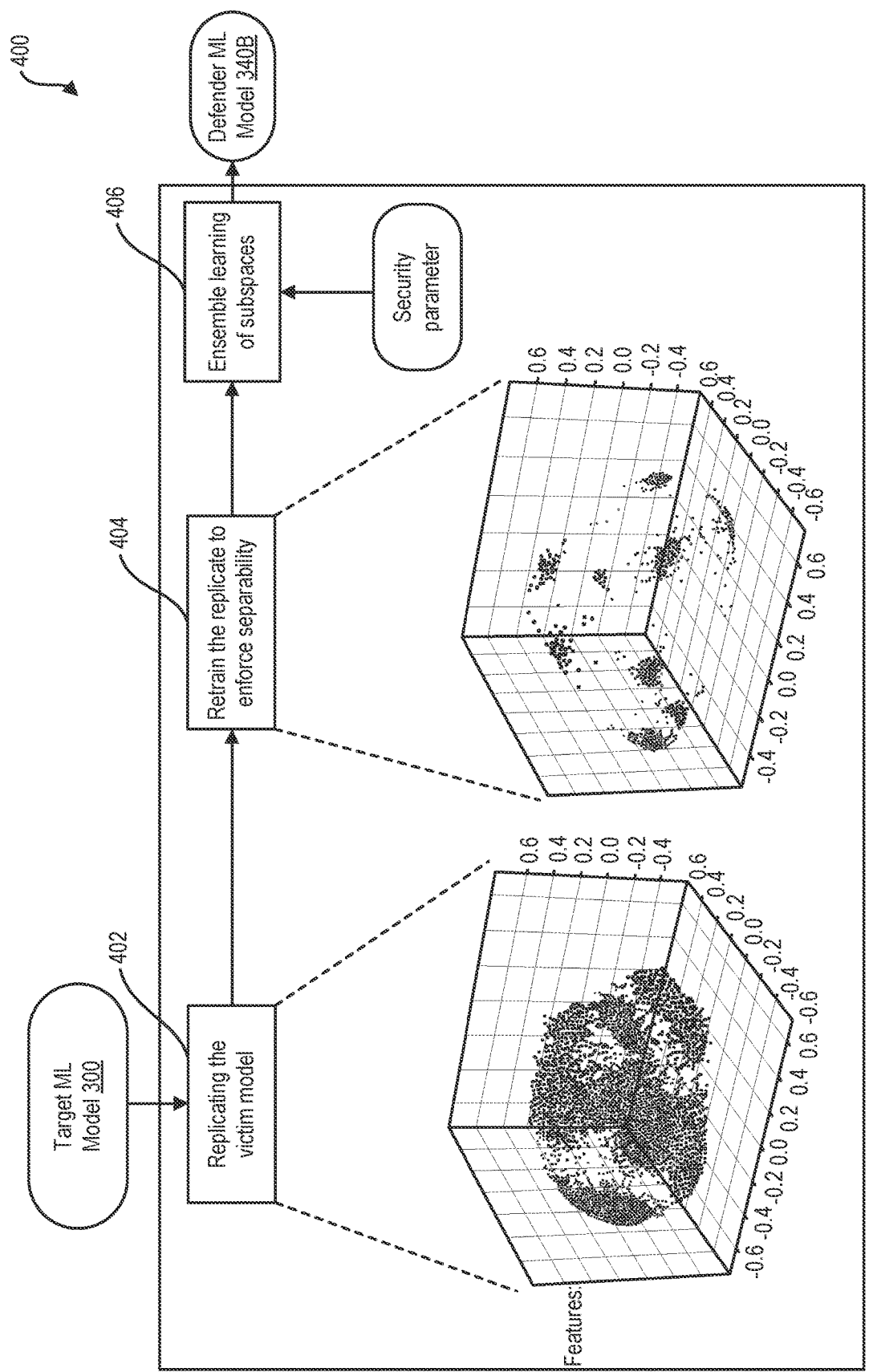
FIG. 4 depicts a flow diagram illustrating an example process for training a defender machine learning model deployed at an intermediate layer of a target machine learning model, in accordance with some example embodiments.

To further illustrate, FIG. 4 depicts a flow diagram illustrating an example process 400 for training a defender machine learning model deployed at an intermediate layer of a target machine learning model, in accordance with some example embodiments. Referring to FIGS. 3-4, the process 400 may be performed to train the second defender machine learning model 340B deployed at the second intermediate layer 320B of the target machine learning model 300.

At 402, a defender machine learning model may be generated by at least replicating a target machine learning model. For instance, the second defender machine learning model 340B may be generated by at least replicating the target machine learning model 300. In addition to replicating the topographical structure and parameters (e.g., weights, biases, and/or the like) of the target machine learning model 300, the second defender machine learning model 340B may further replicate the latent responses (e.g., feature maps) observed at the second intermediate layer 320B of the target machine learning model 300. Accordingly, in some example embodiments, the replication of the target machine learning model 300 may include inserting, at the second intermediate layer 320B, a normalization layer such as, for example, an $L_2$ normalization layer, an $L_1$ normalization layer, and/or the like. The normalization layer may be configured to map, into an Euclidean space, latent feature variables f (x) observed at the second intermediate layer 320B. For instance, an $L_2$ normalization layer may map the latent feature variables f (x) such that the latent feature variables f (x) occupy a d-dimensional hyper-sphere (e.g., $\|f(x)\|_2 = 1$). Normalizing the latent feature variables f (x) may at least partially remove the effects of over-fitting to certain data samples having unusually high correlations with the parameters (e.g., weights, biases, and/or the like) of the target machine learning model 300.

At 404, the defender machine learning model may be trained to generate a probability density function. In some example embodiments, training the second defender machine learning model 340B may include optimizing the loss function expressed by Equation (5) below.

$$\gamma \left[ \underbrace{\|C^{y^*} - f(x)\|_2^2}_{loss_1} - \underbrace{\sum_{i \neq y^*} \|C^i - f(x)\|_2^2}_{loss_2} + \underbrace{\sum_i (\|C^i\|_2 - 1)^2}_{loss_3} \right] \quad (5)$$

wherein γ may correspond to a tradeoff parameter specifying the contribution of the additive loss term, f (x) may denote the intermediate feature vectors containing the latent responses x output by the second intermediate layer 220B, y* may denote a ground-truth labels of the input samples received at the input layer 220A, and $C^i$ may denote the center values of all clusters within the intermediate vector (f(x)) corresponding to an $i^{th}$ class of input samples.

It should be appreciated that the center values $C^i$ and the intermediate feature vectors f(x) may be trainable variables, which may be learned through the training of the second defender machine learning model 340B. Furthermore, the first lost term ($loss_1$) may correspond to a distance between input samples from a same class while the second loss term ($loss_2$) may correspond to a distance between input samples from different classes. As such, the optimization of the loss function expressed by Equation (5) may include adjusting the center values $C^i$ and/or the intermediate feature vectors f(x) to minimize the first lost term ($loss_1$) and/or maximize the second loss term ($loss_2$). The loss function expressed by Equation (5) may further include a third loss term ($loss_3$) to ensure that the center values $C^i$ lie on a unit d-dimensional sphere and to avoid divergence during the training of the second defender machine learning model 340B.

At 406, a lower dimensional representation of the probability density function may be generated for the defender machine learning model. In some example embodiments, high dimensional datasets may be represented as an ensemble of lower dimensional subspaces. Accordingly, the dimensionality of the probability density function determined at operation 404 may be reduced in order to generate a lower-dimensional representation of the probability density function. For instance, a class of input samples may be expressed as a first spherical density in a subspace occupied by that class of input samples and/or a second spherical density in an orthogonal complementary space. As such, the variables of the probability density function (e.g., mean, conditional variance, and/or the like) for each class of input samples may be expressed as a composition of these lower dimensional subspaces. The lower dimensional representation of the probability density function, for example, the corresponding mean and/or conditional covariance, may be used to determine a probability $p(f(x)|y^i)$ of a latent response x as being triggered by a malicious input sample and/or a legitimate input sample received at the target machine learning model 300. As noted, the probability $p(f(x)|y^i)$ may be compared to a security parameter corresponding to a threshold probability for the input sample to be recognized as a legitimate input sample.

According to some example embodiments, when multiple defender machine learning models are deployed at the intermediate layers of the target machine learning model 300, these defender machine learning models may be trained to form a sequence (e.g., a Markov chain) of machine learning models, in order to generate a set of negatively correlated defender machine learning models. The set of negatively correlated defender machine learning models may be capable of countering adaptive adversarial attacks in which the target machine learning model 300 may be given malicious input samples x+η, which may have been adapted t include the perturbation η such that the corresponding feature vector φ(x+η) may be far from the target center values $C^i$ associated with the legitimate input x but close to different target center values $C^j$. To prevent adaptive adversarial attacks, each negatively correlated defender machine learning models may be trained to detect malicious input samples that include different perturbations (e.g., η).

In order to form a sequence (e.g., Markov chain) of defender machine learning models in sequence, each successive defender machine learning model may be trained using training data that enforces a negative correlation between the defender machine learning models. For example, the $n^{th}$ defender machine learning model may receive an input data x, generate a perturbation η, and form clip(x+η) as input data to the $(n+1)^{th}$ defender machine learning model. It should be appreciated that the clip(•) operation may clip the input samples in a valid range of numerical values (e.g., between 0 and 1). Meanwhile, the perturbation η may be selected as $$\eta = \frac{\partial L_1}{\partial x},$$

wherein $L_1$ may correspond to the first lost term (loss$_1$) in Equation (5) for the $n^{th}$ defender machine learning model. By forming a sequence of defender machine learning models, a malicious input sample that is able to bypass one defender machine learning model may be captured by a subsequent defender machine learning model. For instance, malicious input samples that deviate from the center values $C^i$ of the $n^{th}$ defender machine learning model may be close to the center values $C^j$ of the $(n+1)^{th}$ defender machine learning model.

In some example embodiments, a defender machine learning model that is deployed at an input layer of a target machine learning model may be trained to differentiate between malicious input samples and legitimate input samples prior to any processing by the target machine learning model. For instance, the first defender machine learning model 340A may be deployed at the input layer 310 of the target machine learning model 300. Furthermore, the first defender machine learning model 340A may be trained to detect, prior to any processing by the target machine learning model 300, whether an input sample received at the input layer 310 of the target machine learning model 300 is a malicious input sample or a legitimate input sample. For example, according to some example embodiments, the first defender machine learning model 340A may be trained to learn a dictionary containing features from input samples occupying the explored space of the target machine learning model 300. As input samples in the explored space of the target machine learning model 300 may be legitimate input samples, the first defender machine learning model 340A may apply the dictionary to filter out input samples that occupy the unexplored space of the target machine learning model 300.

Figure 5:
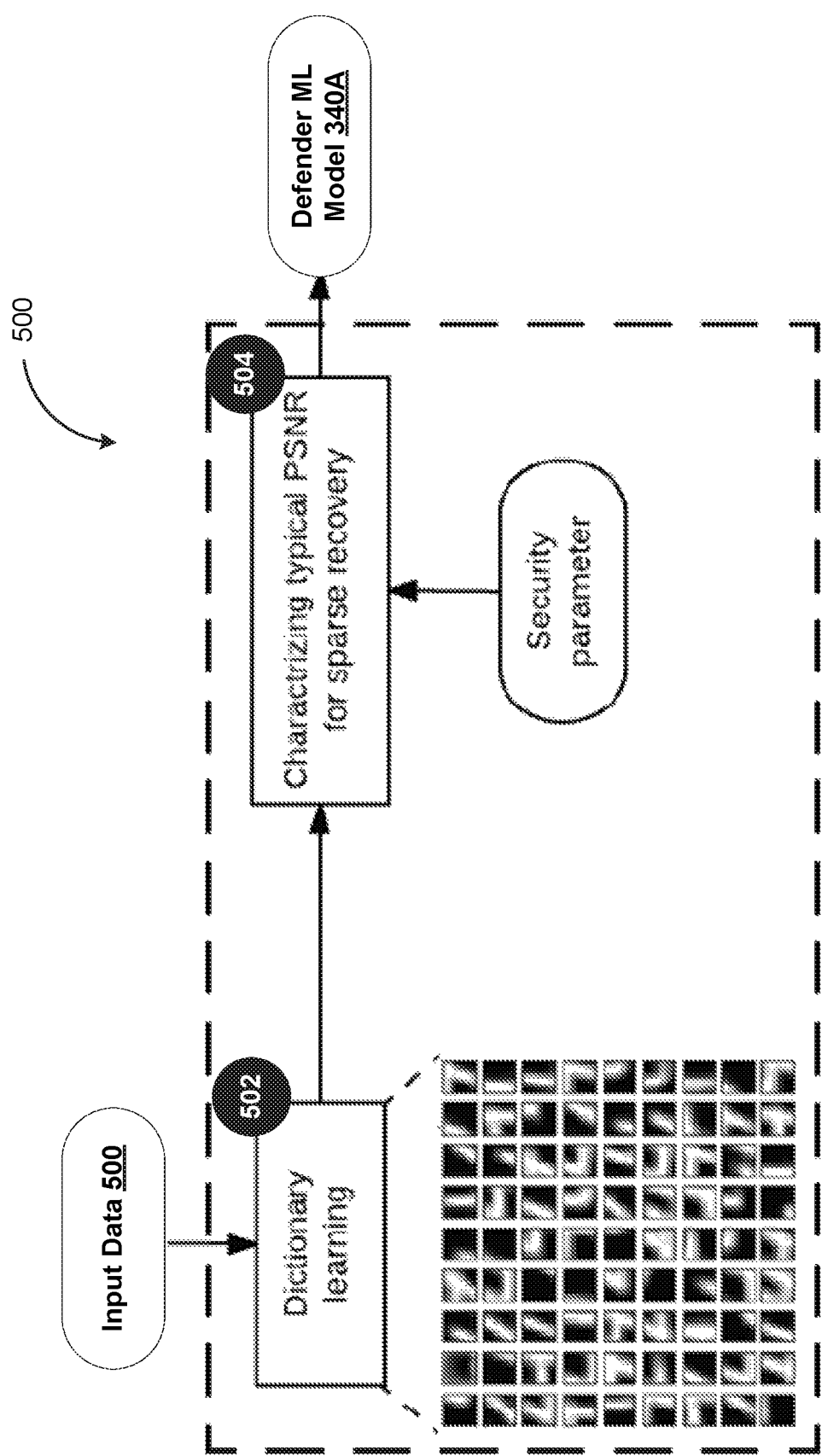
FIG. 5 depicts a flow diagram illustrating an example process for training a defender machine learning model deployed at an input layer of a target machine learning model, in accordance with some example embodiments.

To further illustrate, FIG. 5 depicts a flow diagram illustrating an example process 500 for training a defender machine learning model deployed at an input layer of a target machine learning model, in accordance with some example embodiments. Referring to FIGS. 3 and 5, the process 500 may be performed to train the first defender machine learning model 340A deployed at the input layer 310 of the target machine learning model 300.

At 502, a defender machine learning model may be trained to learn a separate dictionary for each class of input samples received at a target machine learning model. In some example embodiments, the first defender machine learning model 340A may be trained to learn a separate dictionary for each class of input samples received at the target machine learning model 300. Learning the dictionary for each class of input samples may include solving the following Equation (6):

$$\underset{D^i}{\text{argmin}} \frac{1}{2}\|Z^i - D^i V^i\|_2^2 + \beta\|V^i\|_1 \text{ s.t. } \|D_K^i\| = 1, 0 \le K \le K_{max} \quad (6)$$

wherein $Z^i$ may denote a matrix whose columns are features extracted from different regions of an input sample belonging to an $i^{th}$ class. For example, for 8×8 patches of features, each column of $Z^i$ may be a vector of 64 elements. The goal of dictionary learning may be to determine a dictionary matrix $D^i$ that best represents the distribution of feature patches from input samples belonging to the $i^{th}$ class of input samples. That is, the dictionary matrix $D^i$ may include features from the set of legitimate input samples belonging to class i which, as noted, may frequently appear in the training data used to train the target machine learning model 300 and are therefore in the explored subspace of the target machine learning model 300. The quantity of columns in the matrix $D^i$ may correspond to the value $K_{max}$. Furthermore, for certain matrices $D^i$, the feature patches $Z^i$ may be represented by a sparse matrix $V^i$ and the term $D^i V^i$ in Equation (6) may correspond to reconstructed patches.

In some example embodiments, the first defender machine learning model 340A may evaluate the legitimacy of an input sample based at least on an output from the target machine learning model 300 predicting the input sample as belonging to the class i. The first defender machine learning model may attempt to sparsely reconstruct the input sample based on the dictionary matrix $D^i$ for the class i and by applying an Orthogonal Matching Pursuit (OMP) routine. If the input sample is a legitimate input sample, the input sample may be reconstructed, based on the dictionary matrix $D^i$, as $D^i V^*$ with a high peak signal to noise ratio (PSNR) value. It should be appreciated that $V^*$ may denote an optimal solution obtained by applying the Orthogonal Matching Pursuit routine. Meanwhile, a high peak signal to noise ratio may indicate a low level of perturbations being present in the reconstruction $D^i V^*$ of the input sample.

At 504, the defender machine learning model may be further trained to learn a perturbation associated with legitimate input samples from each class of input samples received at the target machine learning model. For instance, the first defender machine learning model 340A may further be trained to recognize a peak signal to noise ratio value of legitimate input samples in each class of input samples received at the target machine learning model 300. A peak signal to noise ratio threshold for a class of input samples may be determined based at least on the peak signal to noise ratio of the legitimate input samples in that class of input samples. The peak signal to noise ratio PSNR of an input sample may be defined by Equation (7) below:

$$PSNR = 20 \log_{10}(MAX_1) - 10 \log_{10}(MSE) \quad (7)$$

wherein the mean square error (MSE) may be defined as the $L_2$ difference between the input sample and the input sample as reconstructed based on the corresponding dictionary. The term $MAX_1$ may correspond to a maximum feature value in the input sample.

In some example embodiments, an input sample received at the target machine learning model 300 may have been classified by the target machine learning model 300 as belonging to the class i. However, the reconstruction $D^iV^*$ of the input sample using the dictionary matrix $D^i$ may have a peak signal to noise ratio that is lower than the threshold peak signal to noise ratio for the $i^{th}$ class of input samples. The low peak signal to noise ratio may indicate a high level of perturbations being present in the reconstruction $D^iV^*$. Accordingly, the first defender machine learning model 340A may identify the input sample as a malicious input sample. For example, the first defender machine learning model 340A may generate an output (e.g., a binary output $d_k \in \{0,1\}$) indicating that the input sample received at the target machine learning model 300 is a malicious input sample.

The one or more defender machine learning models may be trained to prevent an adversarial attack on the target machine learning model by at least detecting malicious input samples engineered to mislead the target machine learning model. As noted, malicious input samples may originate from the unexplored space of the target machine learning model, which may be occupied by subsets of data infrequently encountered by the target machine learning model. Accordingly, the one or more defender machine learning models deployed at the target machine learning model may be trained to learn a probability density function associated with legitimate input samples for the target machine learning model. The probability density function associated with the legitimate input samples of the target machine learning model may correspond to the explored space of the target machine learning model, which may be occupied by subsets of data frequently encountered by the target machine learning model. Furthermore, each of the one or more defender machine learning models may be configured to determine, based on a corresponding probability density function, whether an input sample is a malicious input sample or a legitimate input sample.

Figure 6:
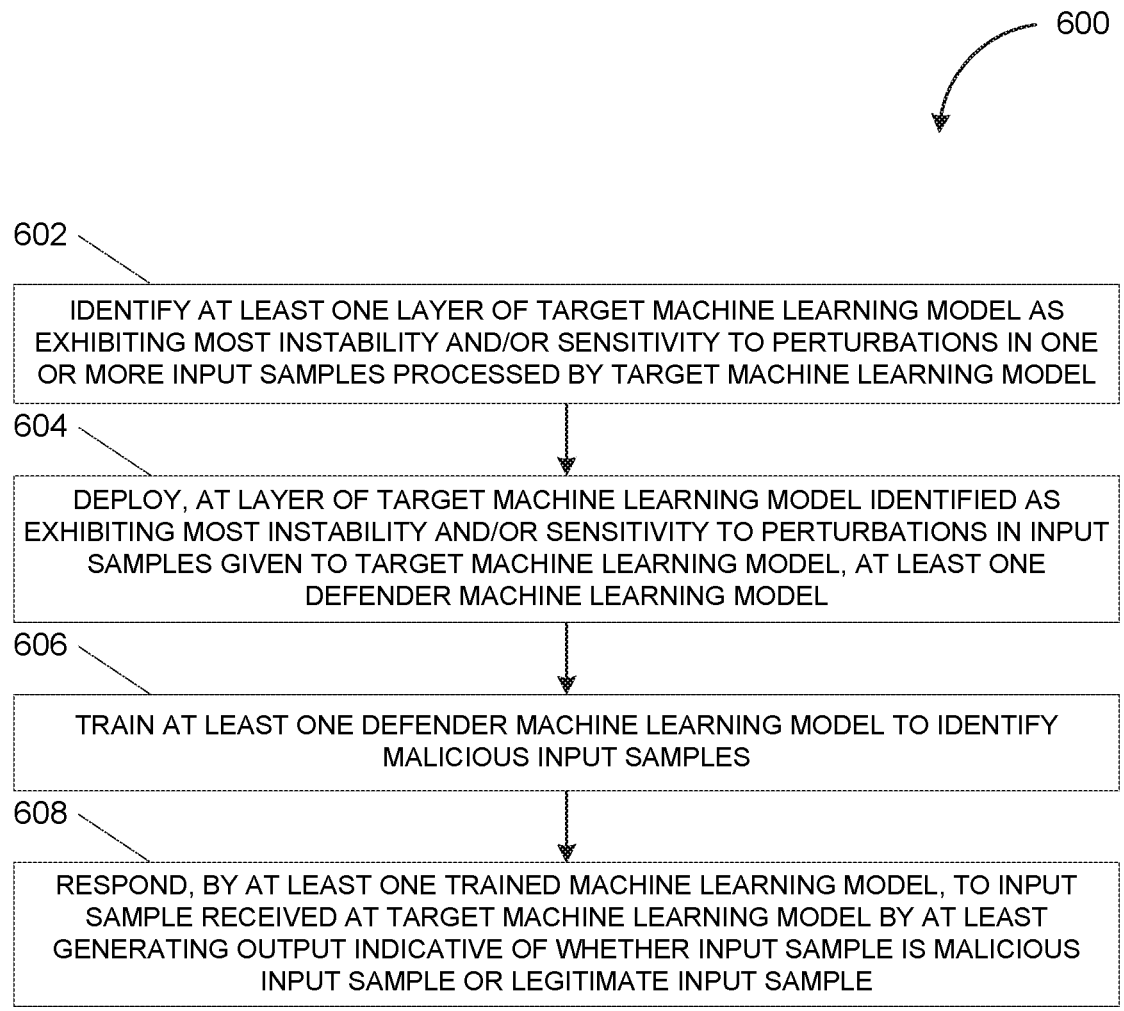
FIG. 6 depicts a flowchart illustrating a process for preventing adversarial attacks against a target machine learning model.

FIG. 6 depicts a flowchart illustrating a process 600 for preventing adversarial attacks against a target machine learning model, in accordance with some example embodiments. Referring to FIGS. 3-6, the process 600 may be performed in order to prevent an adversarial attack (e.g., a discriminatory attack, a generative attack, and/or the like) against the target machine learning model 300.

At 602, at least one layer of a target machine learning model may be identified as exhibiting the most instability and/or sensitivity to perturbations in one or more input samples processed by the target machine learning model. For example, in some example embodiments, the instability and/or the sensitivity of the first intermediate layer 320A and/or the second intermediate layer 320B of the target machine learning model 320 may be quantified based on a respective spectral energy factor (SEF) of the first intermediate layer 320A and/or the second intermediate layer 320B of the target machine learning model 320.

At 604, at least one defender machine learning model may be deployed at the at least one layer of the target machine learning model identified as exhibiting the most instability and/or sensitivity to perturbations in the input samples processed by the target machine learning model. In some example embodiments, defender machine learning models may be deployed at the layers of the target machine learning model that are determined to exhibit the most instability and/or sensitivity. For instance, as shown in FIG. 3, the second defender machine learning model 340B may be deployed at the second intermediate layer 320B but not at the first intermediate layer 320A based at least on the second intermediate layer 320B exhibiting more instability and/or sensitivity to perturbations in the input samples processed by the target machine learning model 300 than the first intermediate layer 320A. The second intermediate layer 320B may exhibit more instability and/or sensitivity than the first intermediate layer 320A by being associated with a higher spectral energy factor (SEF) than the first intermediate layer 320A.

At 606, the at least one defender machine teaming model may be trained to identify malicious input samples. In some example embodiments, a defender machine learning model deployed at the target machine learning model 300 may be trained to learn a probability density function (PDF) associated with the legitimate input samples of the target machine learning model 300. For example, referring to FIG. 3, the first defender machine learning model 340A deployed at the input layer 310 of the target machine learning model 300 may be trained to learn a probability density function of legitimate input samples whereas the second defender machine learning model 340B deployed at the second intermediate layer 340B of the target machine learning model 300 may be trained to learn a probability density function of a latent response triggered by the legitimate input samples. It should be appreciated that the probability density function associated with legitimate input samples may correspond to an explored subspace of the target machine learning model 300. By contrast, malicious input samples may typically originate from the unexplored subspace of the target machine learning model 300. Accordingly, training the first defender machine learning model 340A and/or the second defender machine learning model 340B to learn the probability density functions of legitimate input samples may enable the first defender machine learning model 340A and/or the second defender machine learning model 340B to differentiate between legitimate input samples and malicious input samples.

At 608, the at least one trained defender machine learning model may respond to an input sample received at the target machine learning model by at least generating an output indicative of whether the input sample is a malicious input sample or a legitimate input sample. In some example embodiments, the first defender machine learning model 340A and/or the second defender machine learning model 340B may each apply a corresponding probability density function to determine whether an input sample is a legitimate input sample or a malicious input sample. For example, the first defender machine learning model 340A and/or the second defender machine learning model 340B may each apply a corresponding probability density function to determine a probability of an input sample and/or a latent response to the input sample. The input sample may be identified as a malicious input sample if the probability associated with the input sample and/or the corresponding latent response fails to exceed a threshold value. Accordingly, the first defender machine learning model 340A and/or the second defender machine learning model 340B may generate an output (e.g., a binary output $d_k \in \{0,1\}$) indicative of whether the input sample is a malicious input sample or a legitimate input sample.

According to some example embodiments, the outputs generated by the first defender machine learning model 340A and the second defender machine learning model 340B may be aggregated to form an aggregate probability of the input sample being a malicious input sample (e.g., the confidence metric 350). This aggregate probability (e.g., the confidence metric 350) may indicate a legitimacy of an output inference generated by the target machine learning model 350 in response to the input sample. For instance, the confidence metric 350 associated with an output inference may be low if the output inference is generated by the target machine learning model 350 based on a malicious input sample as determined, for example, by the first defender machine learning model 340A and/or the second defender machine learning model 340B. By contrast, the confidence metric 350 associated with an output inference may be high if the output inference is generated by the target machine learning model 350 based on a legitimate input sample.

Figure 7:
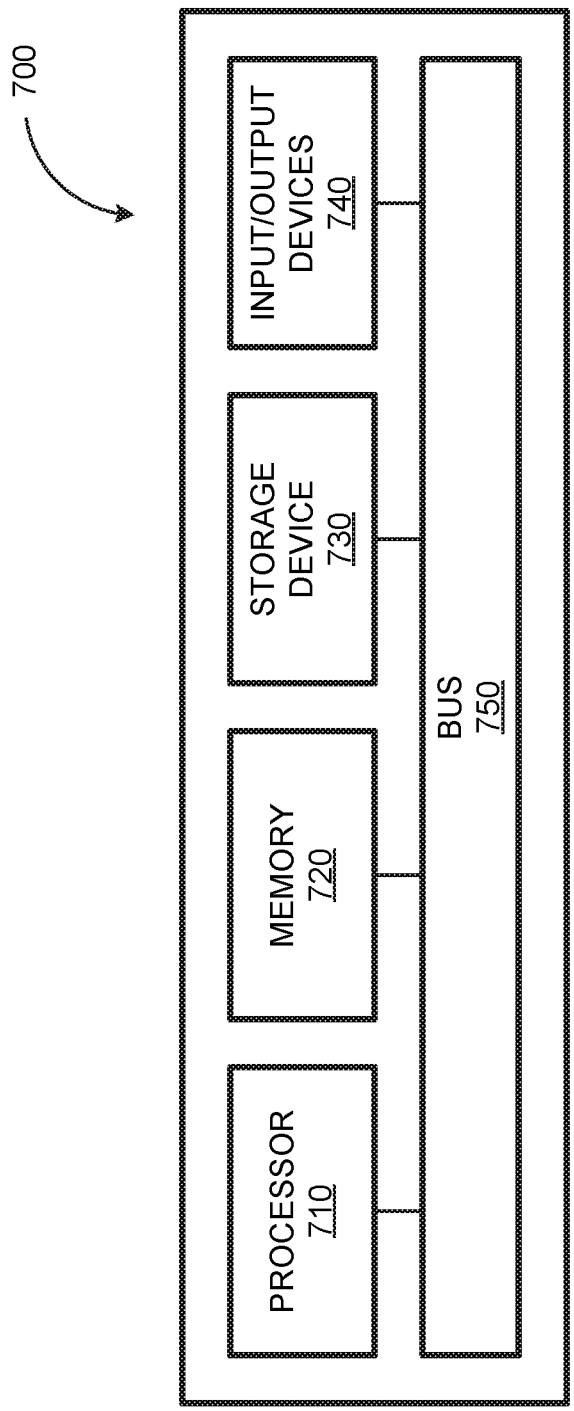
FIG. 7 depicts a block diagram illustrating a computing system, in accordance with some example embodiments.

FIG. 7 depicts a block diagram illustrating a computing system 700, in accordance with some example embodiments. Referring to FIGS. 1 and 7, the computing system 700 can be used to implement the machine learning model 100, the target machine learning model 300, the first defender machine learning model 340A, the second defender machine learning model 340B, and/or any components therein.

As shown in FIG. 7, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. Such executed instructions can implement one or more components of, for example, the machine learning model 100, the target machine learning model 300, the first defender machine learning model 340A, the second defender machine learning model 340B. In some implementations of the current subject matter, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some implementations of the current subject matter, the input/output device 740 includes a keyboard and/or pointing device. In various implementations, the input/output device 740 includes a display unit for displaying graphical user interfaces.

According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some implementations of the current subject matter, the computing system 700 can be used to execute various interactive computer software applications that can be used for organization, analysis and/or storage of data in various (e.g., tabular) format (e.g., Microsoft Excel®, and/or any other type of software). Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one processor; and
   at least one memory including program code which when executed by the at least one processor provides operations comprising:
      training, based at least on training data, a first defender machine learning model to enable the first defender machine learning model to identify malicious input samples; and
      deploying, at a target machine learning model, the trained first defender machine learning model, the trained first defender machine learning model being coupled with the target machine learning model to at least determine whether an input sample received at the target machine learning model is a malicious input sample and/or a legitimate input sample.

2. The system of claim 1, wherein the trained first defender machine learning model responds to the input sample received at the target machine learning model by at least generating a first output indicative of whether the input sample is a malicious input sample and/or a legitimate input sample.

3. The system of claim 2, wherein the first output is aggregated with a second output from a trained second defender machine learning model deployed at the target machine learning model, wherein the second output indicates whether the input sample is determined to be a malicious input sample and/or a legitimate input sample by the trained second defender machine learning, and wherein the first output and the second output are aggregated to generate a metric indicative of a legitimacy of an output inference generated by the target machine learning model processing the input sample.

4. The system of claim 3, further comprising:
   identifying, based at least on an instability and/or a sensitivity exhibited by a layer of the target machine learning model to perturbations in one or more input samples processed by the target machine learning model, the layer of the target machine learning model; and
   deploying, at the layer of the target machine learning model, the trained first defender machine learning model.

5. The system of claim 1, wherein the trained first defender machine learning model is deployed at a layer of the target machine learning model and a second defender machine learning model is deployed at a subsequent layer of the target machine learning model.

6. The system of claim 5, wherein the first defender machine learning model and the second defender machine learning model are configured to be negatively correlated by at least training the second defender machine learning model based on training data that includes perturbations not present in the training data used to train the first defender machine learning model, and wherein the trained second defender machine learning model identifies at least some malicious input samples that are able to bypass the trained first defender machine learning model.

7. The system of claim 6, wherein the layer of the target machine learning model comprises an input layer of the target machine learning model, and wherein the trained first defender machine learning model is deployed at the input layer of the target machine learning model to at least identify malicious input samples prior to any processing by the target machine learning model.

8. The system of claim 7, wherein the layer of the target machine learning model comprises an intermediate layer of the target machine learning model, and wherein the trained first defender machine learning model is deployed at the intermediate layer of the target machine learning model to at least identify malicious input samples based on a latent response triggered, by the malicious input samples, at the intermediate layer of the target machine learning model.

9. The system of claim 8, wherein the intermediate layer of the target machine learning model comprises a core computation layer, a normalization layer, and/or a non-linearity layer.

10. The system of claim 9, wherein the training data includes a plurality of legitimate input samples, and wherein the first defender machine learning model is trained to learn a probability density function of the plurality of legitimate input samples.

11. The system of claim 10, wherein the probability density function corresponds to an explored subspace of the target machine learning model, and wherein the explored subspace is occupied by subsets of data encountered by the target machine learning model during a training of the target machine learning model.

12. The system of claim 11, wherein the training data further excludes malicious input samples, and wherein the first defender machine learning model is subject to unsupervised training based on the training data that excludes malicious input samples.

13. The system of claim 12, wherein the trained first defender machine learning model determines whether the input sample is a malicious input sample and/or a legitimate input sample by at least determining, based on the probability density function, a probability of the input sample originating from the explored subspace of the target machine learning model.

14. The system of claim 13, wherein the input sample is determined to be a malicious input sample based at least on the probability of the input sample originating from the explored subspace of the target machine learning model not exceeding a threshold value.

15. The system of claim 1, wherein the first defender machine learning model is trained to learn a dictionary of features associated with legitimate input samples, and wherein the trained first defender machine learning model determines whether the input sample is a malicious input sample and/or a legitimate input sample by at least reconstructing, based on the dictionary, the input sample.

16. The system of claim 15, wherein the trained first defender machine learning model determines, based at least on a peak signal to noise ratio of the reconstructed input sample, whether the input sample is a malicious input sample and/or a legitimate input sample.

17. The system of claim 16, wherein the first defender machine learning model comprises a replica of the target machine learning model by a least having a same topographical structure and/or parameters as the target machine learning model.

18. The system of claim 17, wherein the target machine learning model and/or the first defender machine learning model comprise a deep learning model.

19. The system of claim 18, wherein a defender machine learning model is deployed at every layer of the target machine learning model, and wherein each defender machine learning model is trained to determine whether the input sample received at the target machine learning model is a malicious input sample and/or a legitimate input sample.

20. A computer-implemented method, comprising:

training, based at least on training data, a first defender machine learning model to enable the first defender machine learning model to identify malicious input samples; and deploying, at a target machine learning model, the trained first defender machine learning model, the trained first defender machine learning model being coupled with the target machine learning model to at least determine whether an input sample received at the target machine learning model is a malicious input sample and/or a legitimate input sample.

* * * * *